US012509587B2

(12) United States Patent
Yamashita et al.

(10) Patent No.: US 12,509,587 B2
(45) Date of Patent: Dec. 30, 2025

(54) CRYSTAL OF INDOCYANINE COMPOUND

(71) Applicant: ASTELLAS PHARMA INC., Tokyo (JP)

(72) Inventors: Hiroyuki Yamashita, Tokyo (JP); Kouji Yamazaki, Tokyo (JP)

(73) Assignee: ASETLLAS PHARMA INC., Tokyo (JP)

( * ) Notice: Subject to any disclaimer, the term of this patent is extended or adjusted under 35 U.S.C. 154(b) by 781 days.

(21) Appl. No.: 17/780,138

(22) PCT Filed: Nov. 25, 2020

(86) PCT No.: PCT/IB2020/061111
§ 371 (c)(1),
(2) Date: May 26, 2022

(87) PCT Pub. No.: WO2021/105888
PCT Pub. Date: Jun. 3, 2021

(65) Prior Publication Data
US 2023/0020197 A1 Jan. 19, 2023

Related U.S. Application Data

(60) Provisional application No. 62/941,389, filed on Nov. 27, 2019.

(51) Int. Cl.
C09B 23/00 (2006.01)
C09B 23/01 (2006.01)
C09B 67/48 (2006.01)

(52) U.S. Cl.
CPC ...... *C09B 23/0066* (2013.01); *C09B 67/0025* (2013.01); *C07B 2200/13* (2013.01)

(58) Field of Classification Search
CPC ................................................ C09B 23/0066
See application file for complete search history.

(56) References Cited

U.S. PATENT DOCUMENTS 10,086,090 B2  10/2018  Teranishi et al.
10,350,310 B2   7/2019  Teranishi et al.

FOREIGN PATENT DOCUMENTS

JP   2003-519698 A   6/2003
JP   2011-173859 A   9/2011
WO     01/51919 A2   7/2001

OTHER PUBLICATIONS

Caira, Crystalline Polymorphism of Organic Compounds, Topics in Chemistry, 198:163-208 (1998).
International Application No. PCT/IB20/61111, International Preliminary Report on Patentability, mailed Jun. 9, 2022.
International Application No. PCT/IB20/61111, International Search Report and Written Opinion, mailed Mar. 10, 2021.
Kurahashi et al., Near-infrared indocyanine dye permits real-time characterization of both venous and lymphatic circulation, Journal of Biomedical Optics, 21(8):86009 (2016).
Hirayama, Handbook for organic compound crystal preparation, Maruzen Co., Ltd., 57-84 (2008).
ICH Steering Committee, Specifications: Test procedures and acceptance criteria for new drug substances and new drug products: Chemical substances, International Conference on Harmonisation, 568 (1999).
Japanese Application No. JP2022-524243, Office Action, Dated Aug. 15, 2024.
Kawaguchi et al., Drug and crystal polymorphism, Journal of Human Environmental Engineering, 4(2):310-317 (2002).
Takata, API form screening and selection in drug discovery stage, Pharm Stage, 6(10):20-25 (2007).
Yamano, Approach to crystal polymorph in process of new drug, Journal of Synthetic Organic Chemistry Japan, 65(9):907-913 (2007).

*Primary Examiner* — Shawquia Jackson
(74) *Attorney, Agent, or Firm* — MARSHALL, GERSTEIN & BORUN LLP

(57) ABSTRACT

The present invention is a crystal of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride.

20 Claims, 15 Drawing Sheets

Absorption 1: Absorption curve of 1st run (from 5%RH to 95%RH)
Desorption 1: Desorption curve of 1st run (from 95%RH to 5%RH)
Absorption 2: Absorption curve of 2nd run (from 5%RH to 95%RH)
Desorption 2: Desorption curve of 2nd run (from 95%RH to 5%RH)

CRYSTAL OF INDOCYANINE COMPOUND

CROSS REFERENCE TO RELATED APPLICATIONS

This application is a U.S. National Stage of International Application No. PCT/IB20/61111, filed Nov. 25, 2020, which claims the benefit of provisional U.S. Patent Application No. 62/941,389, filed Nov. 27, 2019, the entire contents of each of which are fully incorporated herein by reference.

TECHNICAL FIELD

The present invention relates to a novel crystal of an indocyanine compound with the property of emitting near-infrared fluorescence, which is a green pigment useful in the fields of medical diagnostic technology, medical surgery technology, scientific measurement and analysis technology, printing technology, writing technology, painting technology, dyeing technology, and staining technology. The present invention relates more specifically to a crystal of a cyclic sugar chain cyclodextrin-linked indocyanine compound with the property of emitting near-infrared fluorescence, a manufacturing method therefor, and a purification method therefor.

BACKGROUND

This indocyanine compound is listed as Compound (19) and Compound (20) in U.S. patent Ser. No. 10/086,090. Compound (20) is obtained as an inclusion compound, which is a green solid. Compound (20) is listed as TK-1 in J. Biomedical Optics (2016) 21 (8), 086009-1-086009-11, which is amorphous.

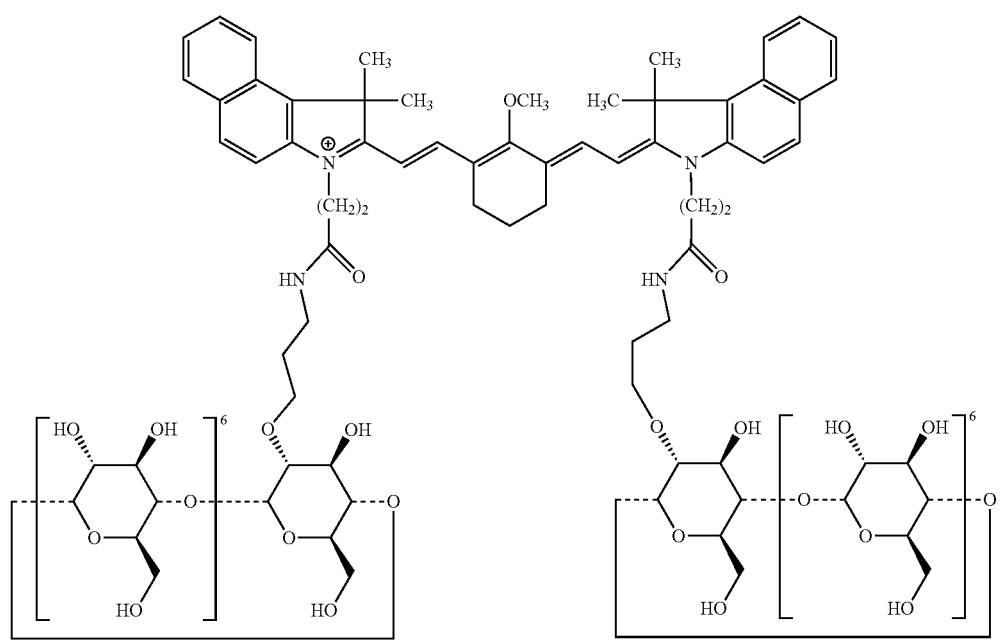

Compound (19)

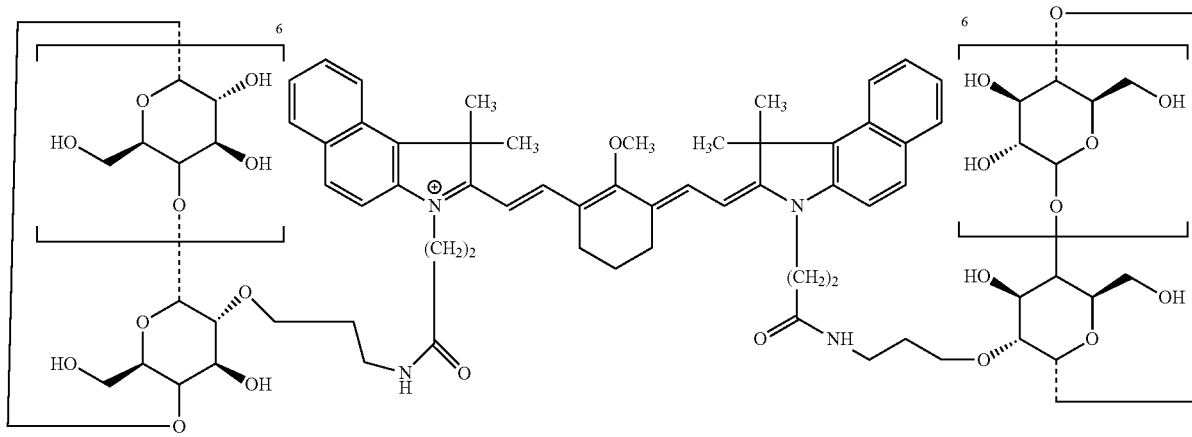

Compound (20): Inclusion Compound

A counter anion of Compound (19) or Compound (20) was chloride ion in the U.S. patent Ser. No. 10/350,310.

The chloride compound (hereinafter Compound A) represented by Formula (I) below.

(I)
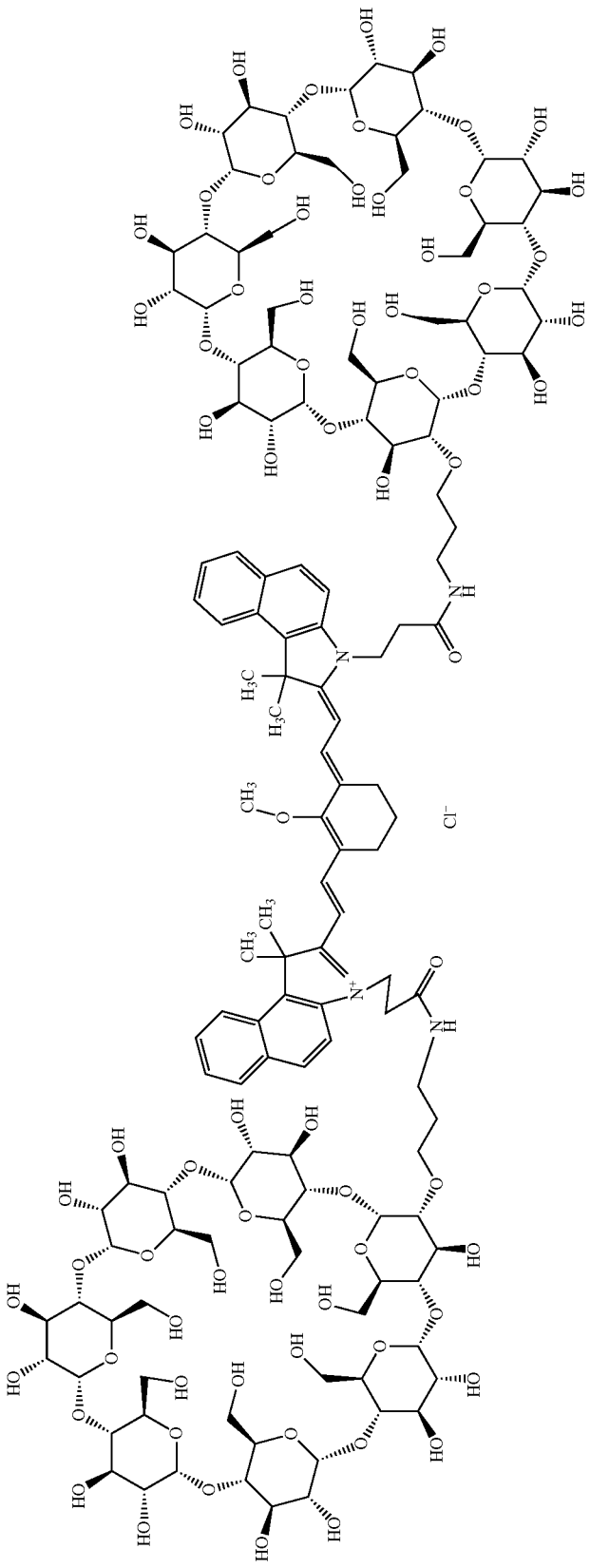

Chemical Name
3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride.

DESCRIPTION OF INVENTION

As a result of extensive research conducted to obtain crystals of Compound (19) or Compound (20), the present inventors obtained crystals of these compounds with chloride.

Also the inventors identified a new profile of the crystal and how to obtain the crystals. Furthermore the inventors found that it was very important to control humidity in order to crystalize Compound A.

The inventors also found the state of the crystal form was related to an amount of water ($H_2O$) molecules.

Specifically, it is the following.

[1] A crystal of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride.

[2] The crystal according to [1], wherein in the powder X-ray analysis using Cu as a radiation source, 2θ (°) exhibits peaks at around 3.7, around 6.1, around 6.3, around 7.0, around 7.7, around 9.6, around 12.4, around 12.5, around 12.7, around 18.5, and around 18.8.

[3] The crystal according to [1], wherein in the powder X-ray analysis using Cu as a radiation source, 2θ (°) exhibits peaks at around 3.9, around 7.3, around 9.6, around 11.0, around 12.5, around 14.6, around 16.5, around 18.5, around 18.7, and around 19.0.

[4] The crystal according to [1], wherein in the powder X-ray analysis using Cu as a radiation source, 2θ (°) exhibits peaks at around 7.7, around 9.2, around 9.8, around 10.4, around 11.1, around 12.3, around 12.9, around 13.3, around 14.4, and around 18.7.

[5] The crystal according to [1], wherein in the powder X-ray analysis using Cu as a radiation source, 2θ (°) exhibits peaks at around 3.7, around 4.3, around 4.8, around 5.4, around 6.3, around 7.7, around 10.9, around 12.3, around 18.4, and around 19.4.

[6] The crystal according to [1], wherein in the powder X-ray analysis using Cu as a radiation source, 2θ (°) exhibits peaks at around 3.7, around 4.3, around 4.8, around 5.4, around 9.5, around 10.9, around 16.2, around 18.4, around 18.6, and around 19.4.

[7] The crystal according to [1], wherein in the powder X-ray analysis using Cu as a radiation source, 2θ (°) exhibits peaks at around 3.0, around 3.7, around 4.1, around 4.5, around 5.7, around 6.1, around 7.2, around 7.8, around 17.2, and around 17.6.

[8] The crystal according to [1], wherein in the powder X-ray analysis using Cu as a radiation source, 2θ (°) exhibits peaks at around 3.7, around 4.8, around 5.4, around 6.1, around 6.3, around 9.0, around 9.9, around 10.3, around 12.4, around 18.5, and around 19.5.

[9] A method for preparing a crystal of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxydyclohex-1-en-1-yl]ethen-1-yl}-1,1-dimethyl-1H-benzo[e]indol-3-ium chloride comprising:

Adding 40 µl to 100 µl of water solution of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride.

[10] The method according to [9], wherein said volume of water is 40 µl to 100 µl of water to per 50 mg of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21'-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride.

[11] The method according to [9] or [10], wherein temperature of said method is over 0° C. to 5° C.

[12] The method according to [9] or [10], wherein the temperature of said method is 4° C.

This data should not strictly be construed because it would depend on measuring conditions. Accordingly this data would be preferably expressed by around 4° C.

[13] A method for preparing a crystal of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride under the following circumstance:

relative humidity 40% to relative humidity 95%.

[14] The method according to [13], wherein said circumstance is relative humidity 40% to relative humidity 90%.

[15] A crystal of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride having 10 to 45 mol of water molecule.

[16] The crystal according to [15] having 17 to 45 mol of water molecule.

[17] The crystal according to [15] or [16] having 17 to 38 mol of water molecule.

INDUSTRIAL APPLICABILITY

Figure 1:
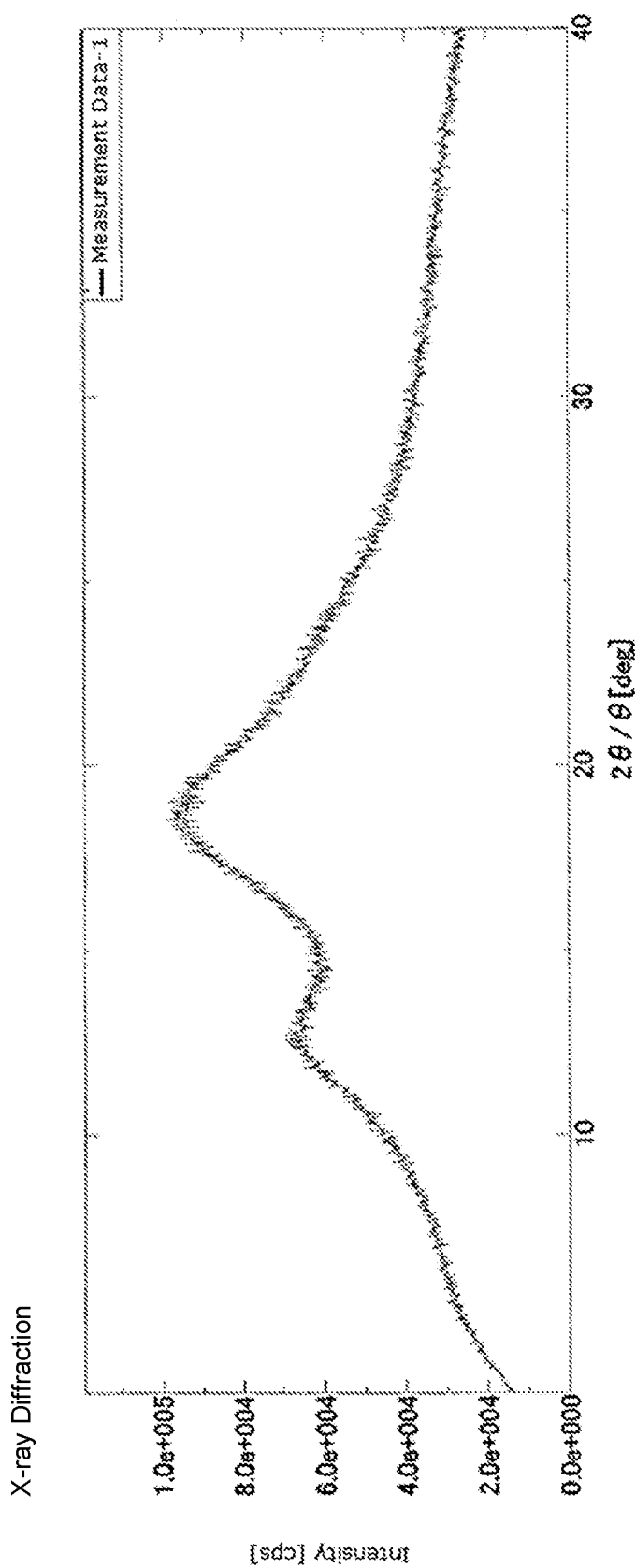
FIG. 1 is an X-ray diffraction diagram of the green solid obtained in Synthesis Example 3.

Crystals of Compound A of the present invention would be compounds that are useful as the active ingredient in pharmaceutical products or medicinal products or intermediates in a manufacturing process.

The crystal of the present invention can be used as a drug substance by combining one or more of the crystal of the present invention with a pharmaceutically acceptable carrier, and excipient, or the like, to prepare the medicament. The preparation of the medicament can be carried out by a method usually employed in this field.

The medicament containing the crystal of the present invention may take any form of preparation for oral administration, such as tablets, pills, capsules, granules, powders, liquids and solutions, and the like; or preparations for parenteral administration, such as intraarticular, intravenous, or intramuscular injections, and the like, suppositories, percutaneous liquid preparations, ointments, transdermal patches, transmucosal liquid preparations, transmucosal patches, inhalations, and the like.

The present invention can be used in diagnosis. The diagnostic composition can be substituted for a diagnostic composition including an indocyanine green which has hitherto been used. The application thereof may include, for example, liver function test drugs, circulatory function test drugs, and the like. In addition, the composition can be applied to medical operations and medical diagnosis in which near-infrared fluorescence emitted by administration thereof to a body such as a blood vessel, lymph vessel, brain, eye, stomach, breast, esophagus, skin, kidney, ureter, bladder, urethra, lung, heart, or other moiety is observed. It is considered that the pigment included in the diagnostic composition of the invention has a low binding property to a living body, and it can label a necessary moiety over a long time.

Synthesis Example 1

Compound (20) could be obtained according to the synthesis example described in J. Biomedical Optics (2016) 21 (8), 086009-1-086009-11.

Synthesis Example 2

Compound (19) or Compound (20) in U.S. patent Ser. No. 10/086,090 or WO 2011093098 were obtained using the described method.

A mixture of 0.02 g of the compound represented by Chemical Formula (18), 0.081 g of the compound represented by Chemical Formula 14, 0.016 g of WSC, 0.011 g of HOBt, 0.3 mL of pyridine, and 0.2 mL of N, N-dimethylformamide was stirred for six hours at 0° C. in a dark place. Next, 5 mL of acetone were added, and the precipitate was filtered under reduced pressure, dissolved in a 0.1% aqueous trifluoroacetic acid solution, and subjected to ODS column chromatography. A mixture of water and methanol containing 1 mM hydrochloric acid was used in the eluate, and the compound represented by Chemical Formula (19) was eluted. The eluate was concentrated under reduced pressure to obtain 0.045 g of an inclusion compound represented by Chemical Formula (20) as a green solid. (When the eluate is concentrated under reduced pressure, the water content at the end of the concentration is high and so the resulting compound is an inclusion compound.)

The following abbreviations were used.

HOBt: 1-hydroxybenzotriazole, WSC: water soluble carbodiimide(1-ethyl-3-(3-dimethylaminopropyl)carbodiimide hydrochloride)

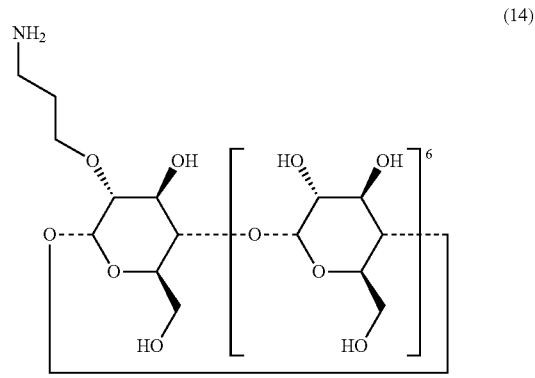

(14)

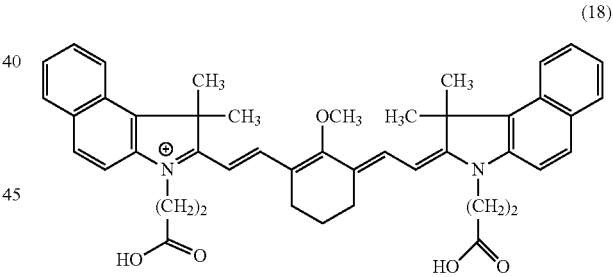

(18)

Synthesis Example 3

First, 58 kg of methanol, 2.6 kg of dimethyl sulfoxide, 19 kg of water, 5.26 kg of 3-(2-carboxyethyl)-2-{(1E)-2-[(3E)-3-{(2E)-2-[3-(2-carboxyethyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride, and 23.7 kg of 21-O-(3-aminopropyl) cyclomaltoheptaose (pure content 21.5 kg) were mixed together at an internal temperature of about 20° C. Next, 4.68 kg of 4-(4,6-dimethoxy-1,3,5-triazin-2-yl)-4-methylmorpholinium chloride (DMT-MM) (pure content 3.98 kg) were added, and the mixture was washed with an aqueous methanol solution (6.8 kg of methanol and 2.1 kg of water) and stirred at an internal temperature of about 20° C. for about two hours. Afterwards, 2.34 kg of DMT-MM (pure content 1.99 kg) and 0.726 kg of N-methylmorpholine were added, and the mixture was stirred at an internal temperature of about 20° C. for about two hours. Next, 2.34 kg of DMT-MM (pure content 1.99 kg) was added at an internal temperature of about 20° C. Then, 84 kg of methanol were added dropwise over about one hour, and the mixture was stirred at an internal temperature of about 20° C. for about 16 hours. Next, 250 kg of acetone were added dropwise over two hours, and the resulting suspension was stirred at an internal temperature of about 20° C. for about 19 hours. Filtration was performed, and the filtrate was washed with an acetone-methanol mixture (58 kg of acetone and 28 kg of methanol) and then washed twice with 84 kg of acetone. Vacuum drying was performed at an external temperature setting of about 30° C. to obtain 24.68 kg of a green solid. This was dissolved in 5 mM aqueous hydrochloric acid and purified using ODS column chromatography (ODS 130 kg, mobile phase: 5 mM aqueous hydrochloric acid solution→30% aqueous methanol solution (v/v)→40% aqueous methanol solution (v/v)→80% aqueous methanol solution (v/v)). The target product was collected and the methanol was distilled off under reduced pressure to obtain a concentrated solution. Next, all of the concentrated liquid was adsorbed in HP20SS column chromatography, and the flushed active component (HP20SS 130 kg, mobile phase: 60% aqueous methanol solution (v/v)→80% aqueous methanol solution (v/v)) was collected. The active component was concentrated under reduced pressure, subjected to clarifying filtration, and then freeze-dried to obtain 8.62 kg of a green solid. Then, 4.9 kg of this was dissolved in 1 mM aqueous hydrochloric acid solution and purified by ODS column chromatography (ODS 150 kg, mobile phase: 1 mM aqueous hydrochloric acid solution→30% aqueous methanol solution (v/v)→40% aqueous methanol solution (v/v)). The target product was collected and the methanol was distilled off under reduced pressure to obtain a concentrated solution. Next, all of the concentrated liquid was adsorbed in HP20SS column chromatography, and the flushed active component (HP20SS 67.8 kg, mobile phase: 60% aqueous methanol solution (v/v)→80% aqueous methanol solution (v/v)) was collected. Activated carbon was added, and the mixture was stirred at an internal temperature of about 20° C. for about two hours. The activated carbon was removed using a filter pre-coated with radiolite, clarifying filtration was performed, and then lyophilization was performed to obtain 1.88 kg of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride ("Compound A") as a green solid.

The following are the physicochemical properties of the resulting compound.

Instrument Analysis Data $^1$H-NMR
Assignment of $^1$H NMR Spectrum (D$_2$O)

TABLE 1

| Chemical Shift δ (ppm) | Multiplicity[1] and Coupling Constant (Hz) | Number of Protons | Position No. |
|---|---|---|---|
| 1.66 | m | 2 | 2, 54 |
| 1.81 | m | 2 | 2, 54 |
| 2.12 | m | 2 | 29 |
| 2.33 | s | 6 | 22, 48[a] |
| 2.44 | s | 6 | 21, 47[a] |

TABLE 1-continued

| Chemical Shift δ (ppm) | Multiplicity[1] and Coupling Constant (Hz) | Number of Protons | Position No. |
|---|---|---|---|
| 4.35 | s | 3 | 31 |
| 2.3-4.7 | — | 104 | 1, 3, 6, 7, 28, 30, 49, 50, 53, 55, 1', 1", 2', 2", 3', 3", 4', 4", 6', 6", 8', 8", 9', 9", 10', 10", 11', 11", 12', 12", 14', 14", 15', 15", 16', 16", 17', 17", 18', 18", 20', 20", 21', 21", 22', 22", 23', 23", 24', 24", 26', 26", 27', 27", 28', 28", 29', 29", 30', 30", 32', 32", 33', 33", 34', 34", 35', 35", 36', 36", 38', 38", 39', 39", 40', 40", 41', 41", 42', 42" |
| 5.00 | d | 2 | 5', 5", 7', 7"13', 13"', 19', 19", |
| 5.08 | d | 2 | 25', 25", 31', 31", 37', 37" |
| 5.10 | d | 2 | |
| 5.21 | d | 2 | |
| 5.29 | d | 2 | |
| 5.39 | d | 2 | |
| 5.43 | d | 2 | |
| 6.44 | d (J = 14.4 Hz) | 2 | 23, 33 |
| 7.72 | m | 4 | 14, 15, 39, 40 |
| 7.87 | d (J = 8.8 Hz) | 2 | 10, 44 |
| 8.07 | M | 2 | 13, 41 |
| 8.39 | M | 2 | 16, 38 |
| 8.45 | d (J = 14.4 Hz) | 2 | 24, 32 |
| 8.48 | d (J = 8.8 Hz) | 2 | 11, 43 | s: singlet,
d: doublet,
m: multiplet
[a]Assignments may be interchangeable.

Elemental Analysis

TABLE 2

| Element | C | H | N | Cl |
|---|---|---|---|---|
| Calculated (%) | 52.65 | 6.45 | 1.82 | 1.15 |
| Found[a] (%) | 52.66 | 6.41 | 1.80 | 1.18 |

[a]Corrected by the hypothetical water content of 11.5%

According to the data in FIG. 1, the green solid of Compound A was amorphous.

EXAMPLES

Crystals of Compound A were obtained in the following examples.

In the crystallization process, crystals could be obtained at room temperature unless otherwise indicated.

The following abbreviations are used in the text.

MeOH: methanol, EtOH: ethanol, MeCN: acetonitrile, aq: aqueous solution

Example 1

Figure 2:
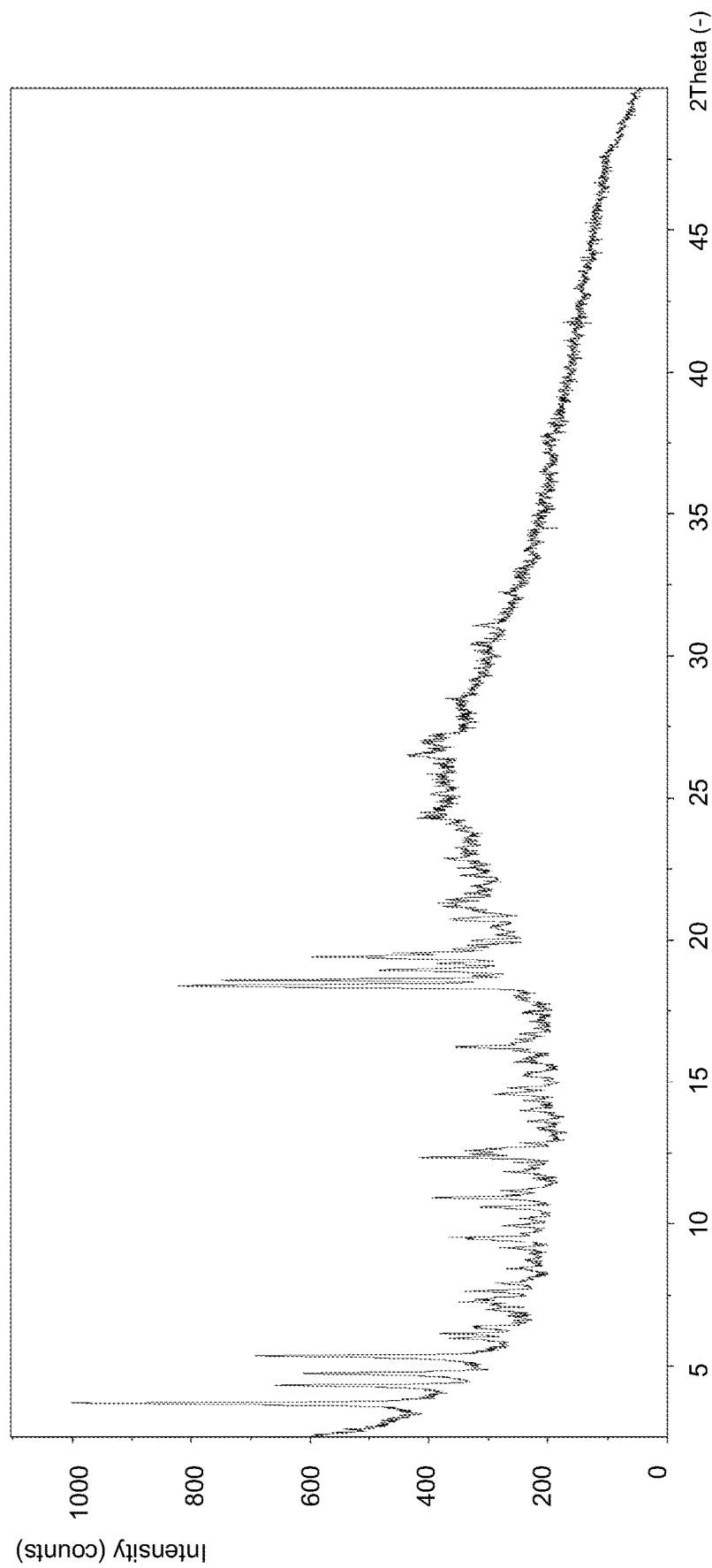
FIG. 2 is an X-ray diffraction diagram of Compound A when 50% MeCN aq was used.

After dissolving Compound A (100 mg) in 50% MeCN aq (0.5 ml) and allowing the solution to stand for one day, the resulting solid was sampled in a holder for transmission measurement in which Kapton film had been set and subjected to an X-ray diffraction measurement using PANalytical Empyrean with copper X-ray tube at a tube voltage of 45 kV and a tube current of 40 mA to confirm the diffraction peaks. (FIG. 2)

The characteristic peaks in the diffraction are as follows.

In a powder X-ray analysis using Cu as a radiation source, 2θ (°) exhibits peaks at around 3.7, around 4.3, around 4.8, around 5.4, around 9.5, around 10.9, around 16.2, around 18.4, around 18.6, and around 19.4.

Example 2

Figure 3:
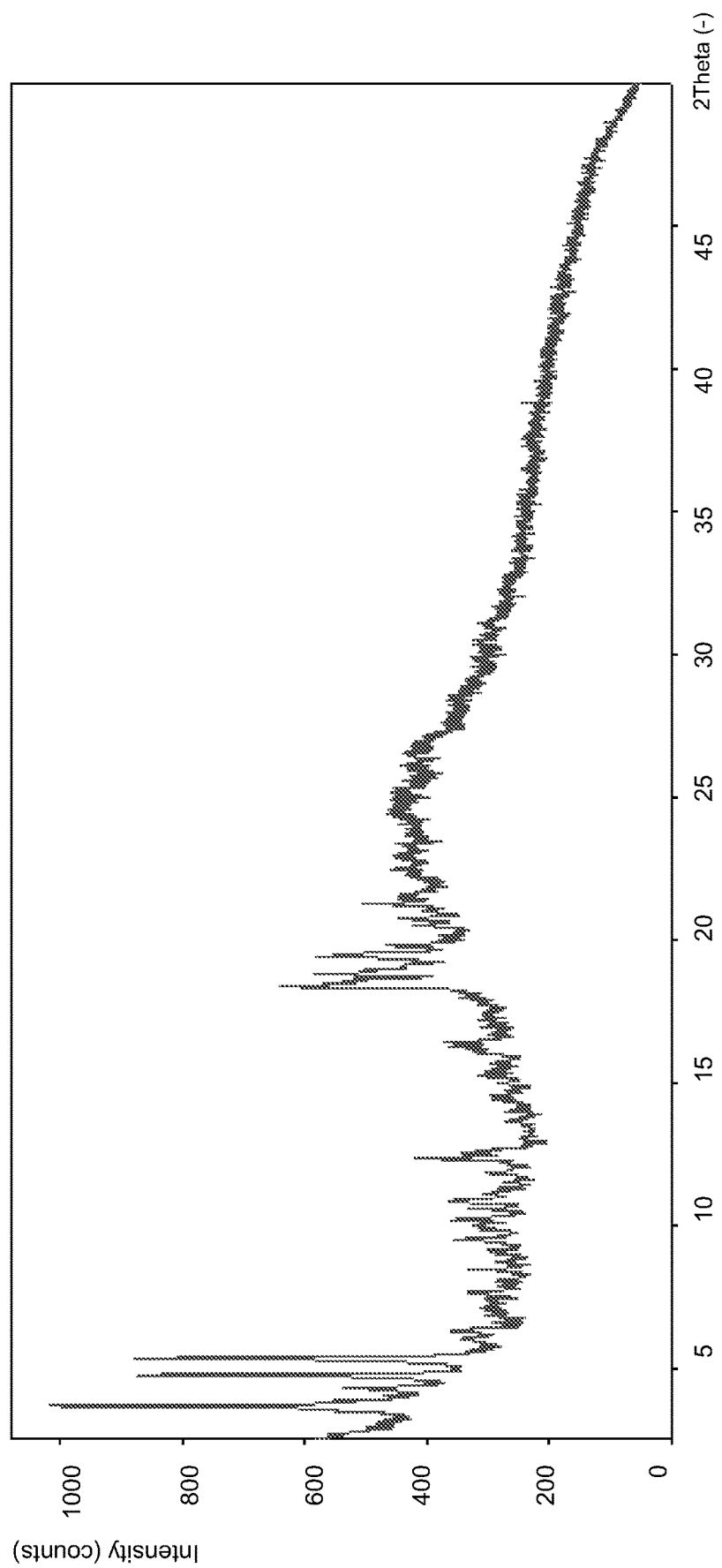
FIG. 3 is an X-ray diffraction diagram of Compound A when 50% EtOH aq was used.

After dissolving Compound A (100 mg) in 50% EtOH aq (0.4 ml) and allowing the solution to stand for one day, the resulting solid was sampled in a holder for transmission measurement in which Kapton film had been set and subjected to an X-ray diffraction measurement using PANalytical Empyrean with copper X-ray tube at a tube voltage of 45 kV and a tube current of 40 mA to confirm the diffraction peaks. (FIG. 3)

The characteristic peaks in the diffraction are as follows.

In a powder X-ray analysis using Cu as a radiation source, $2\theta$ (°) exhibits peaks at around 3.7, around 4.3, around 4.8, around 5.4, around 6.3, around 7.7, around 10.9, around 12.3, around 18.4, and around 19.4.

Example 3

Figure 4:
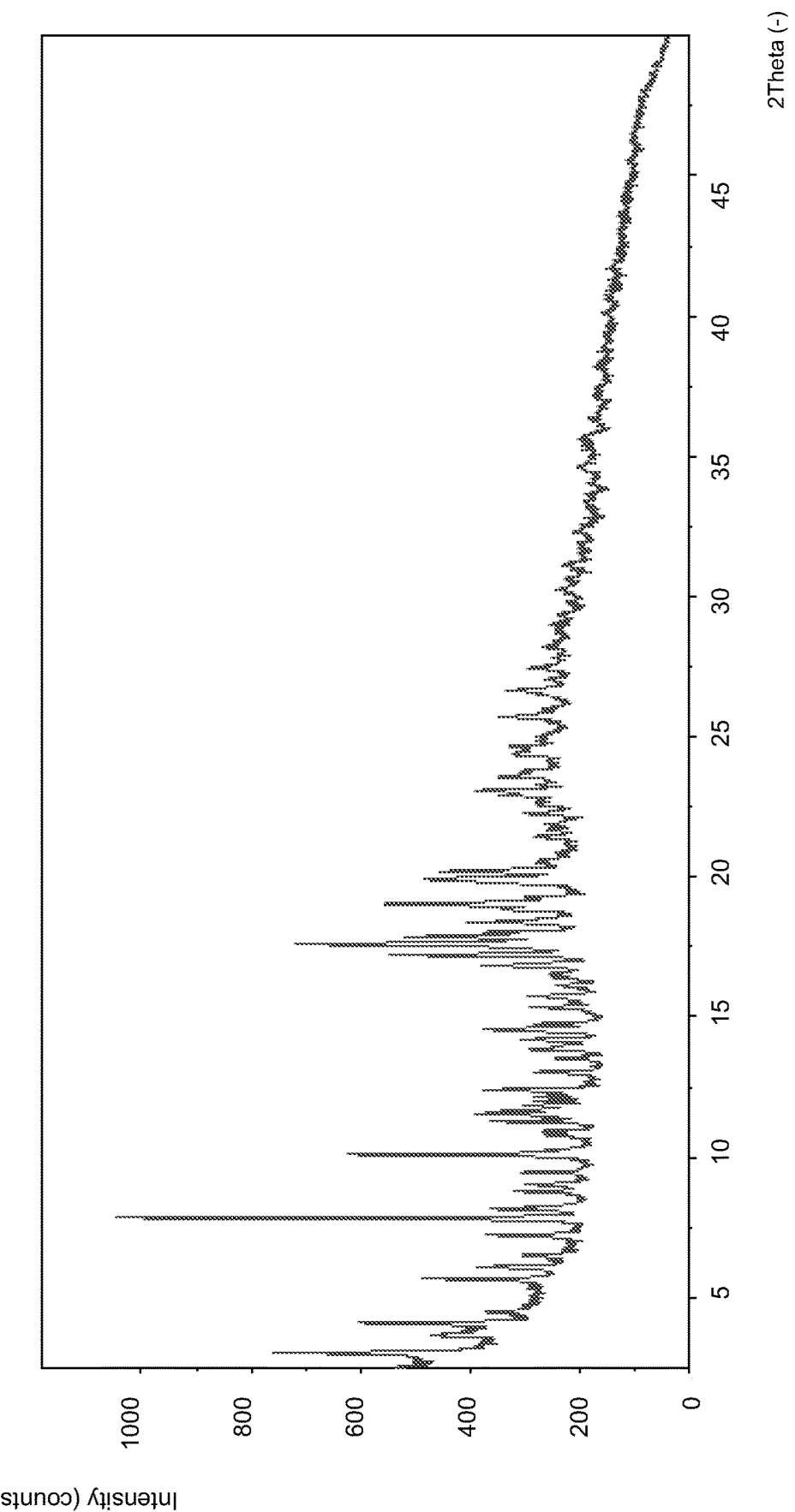
FIG. 4 is an X-ray diffraction diagram of Compound A when 50% acetone aq was used.

Five days after dissolving Compound A (100 mg) in 50% acetone aq (0.2 ml) seed crystals of Compound A were added. The solution was allowed to stand for seven days. The resulting solid was sampled in a holder for transmission measurement in which Kapton film had been set and subjected to an X-ray diffraction measurement using PANalytical Empyrean with copper X-ray tube at a tube voltage of 45 kV and a tube current of 40 mA to confirm the diffraction peaks. (FIG. 4)

The characteristic peaks in the diffraction are as follows.

In a powder X-ray analysis using Cu as a radiation source, $2\theta$ (°) exhibits peaks at around 3.0, around 3.7, around 4.1, around 4.5, around 5.7, around 6.1, around 7.2, around 7.8, around 17.2, and around 17.6.

Example 4

Figure 5:
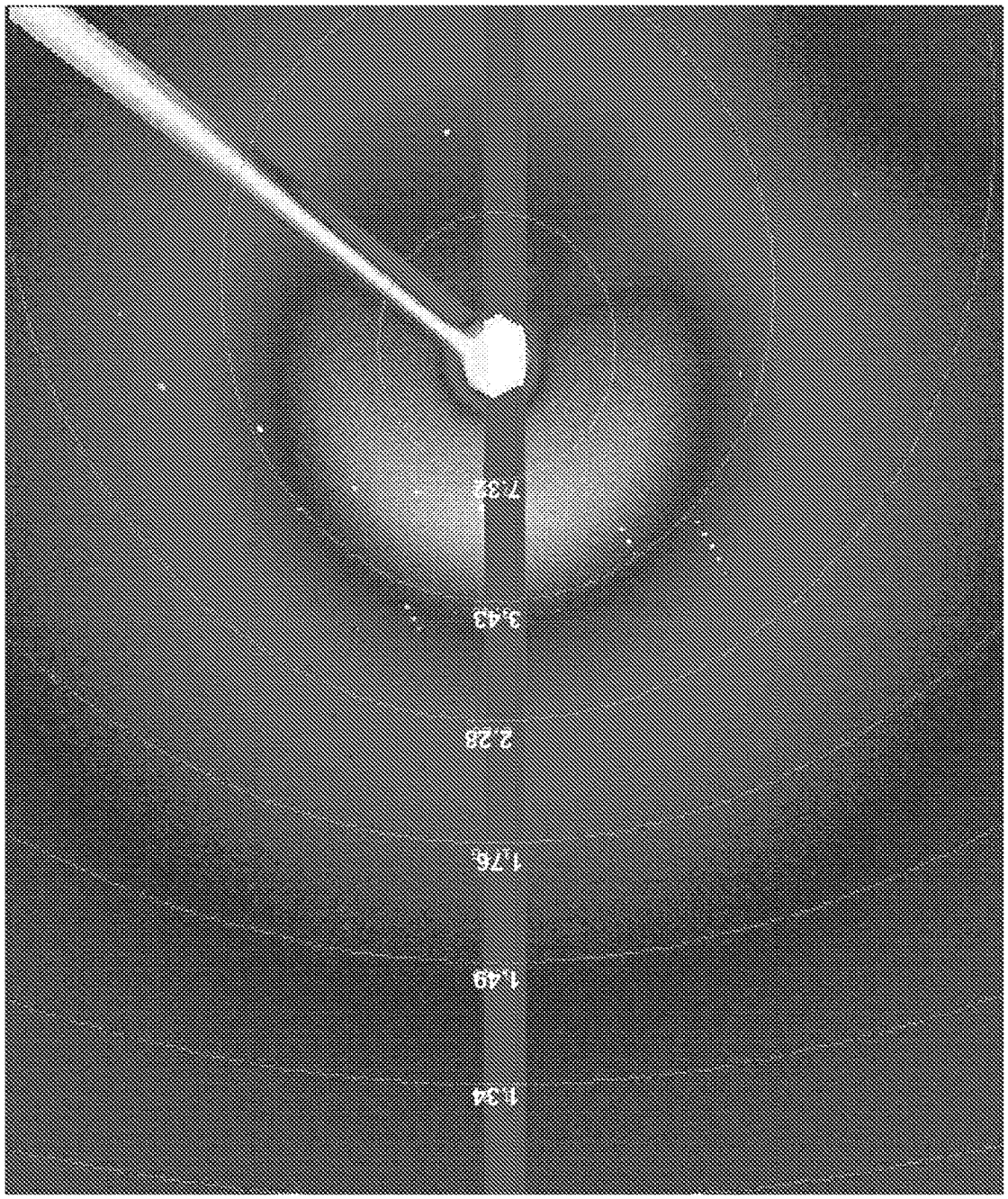
FIG. 5 shows diffraction spots from an X-ray diffraction measurement of Compound A when 50% propylene glycol aq was used.

Five days after dissolving Compound A (100 mg) in 50% propylene glycol aq (0.2 ml), seed crystals of Compound A were added. The solution was allowed to stand for one day, and then single crystals were taken from the resulting solid and subjected to an X-ray diffraction measurement using Rigaku XtaLAB P200 with copper target at a tube voltage of 40 kV and a tube current of 30 mA to confirm the diffraction spots. (FIG. 5)

Figure 6:
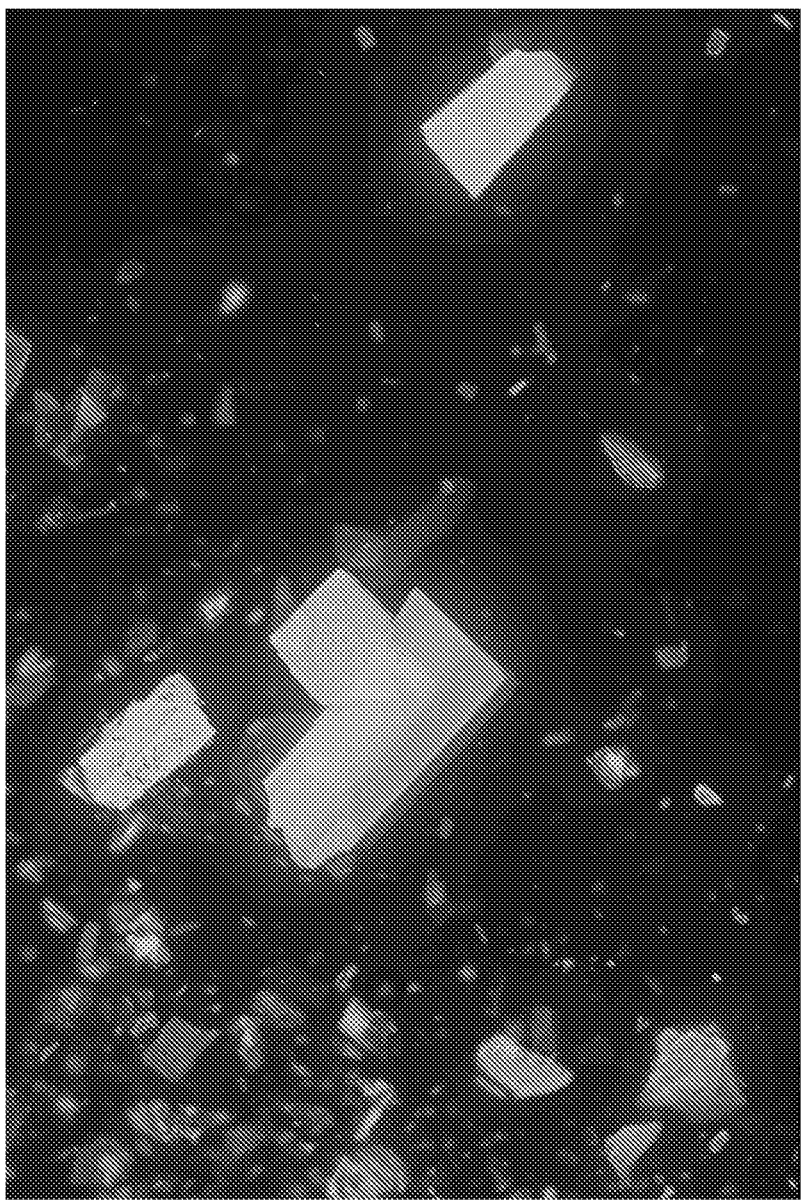
FIG. 6 is a polarized micrograph of Compound A when 50% propylene glycol aq was used.

A polarized micrograph of the solid was also taken. (FIG. 6)

Example 5

Figure 7:
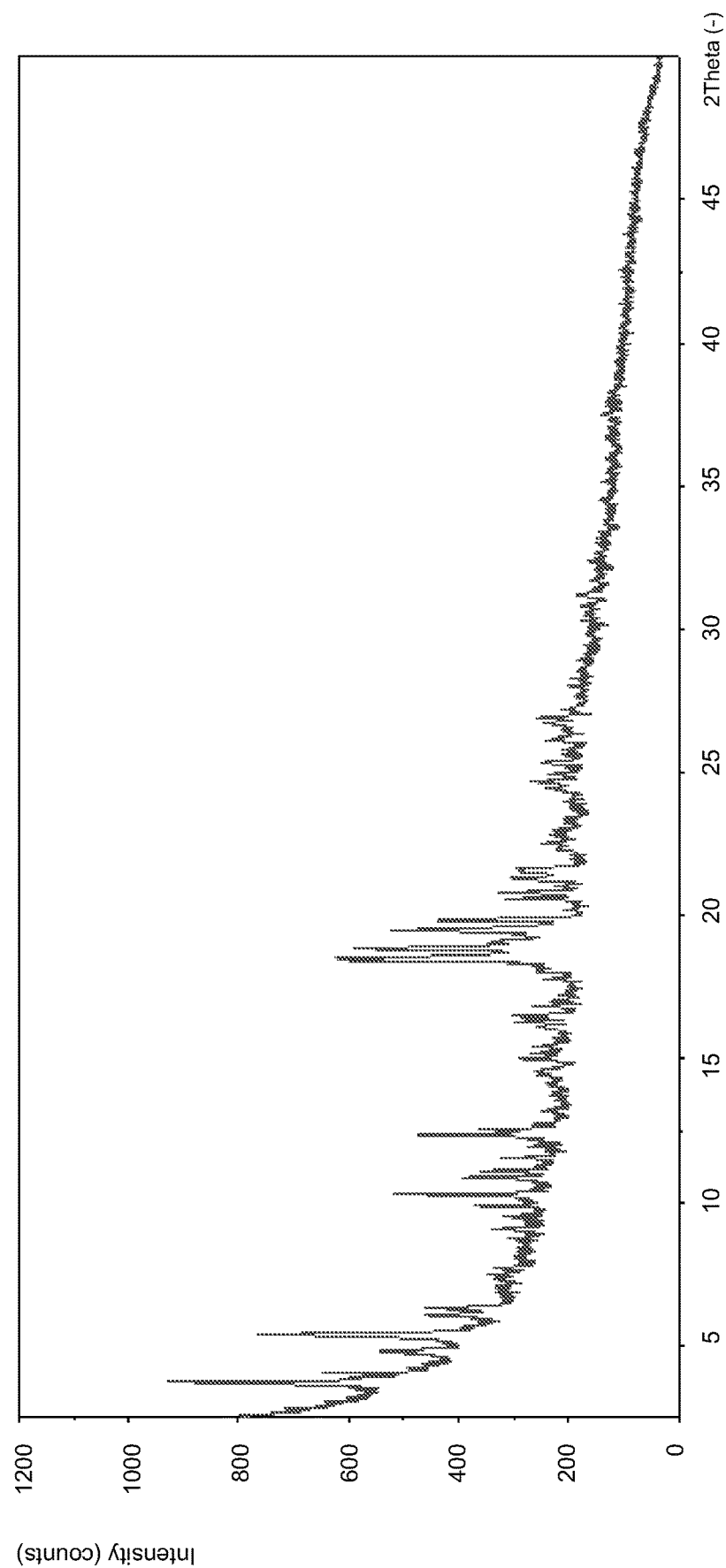
FIG. 7 is an X-ray diffraction diagram of Compound A obtained when allowed to stand under saturated steam.

After allowing Compound A (10 mg) to stand for one day under saturated steam, the resulting solid was sampled in a holder for transmission measurement in which Kapton film had been set and subjected to an X-ray diffraction measurement using PANalytical Empyrean with copper X-ray tube at a tube voltage of 45 kV and a tube current of 40 mA to confirm the diffraction peaks. (FIG. 7)

The characteristic peaks in the diffraction are as follows.

In a powder X-ray analysis using Cu as a radiation source, $2\theta$ (°) exhibits peaks at around 3.7, around 4.8, around 5.4, around 6.1, around 6.3, around 9.0, around 9.9, around 10.3, around 12.4, around 18.5, and around 19.5.

Figure 8:
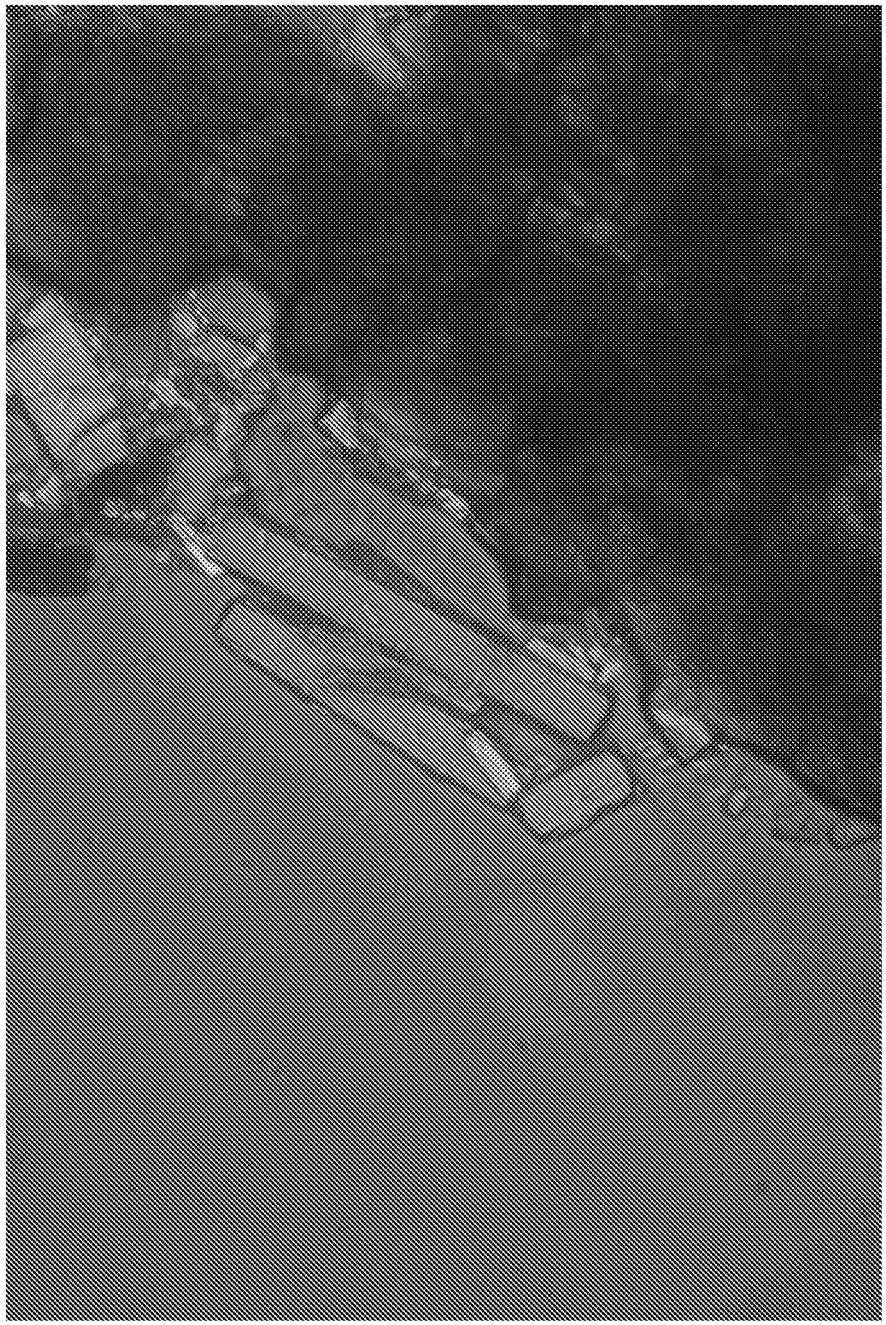
FIG. 8 is a polarized micrograph of Compound A obtained when allowed to stand under saturated steam.

A polarized micrograph of the solid was taken. (FIG. 8)

Example 6

Figure 9:
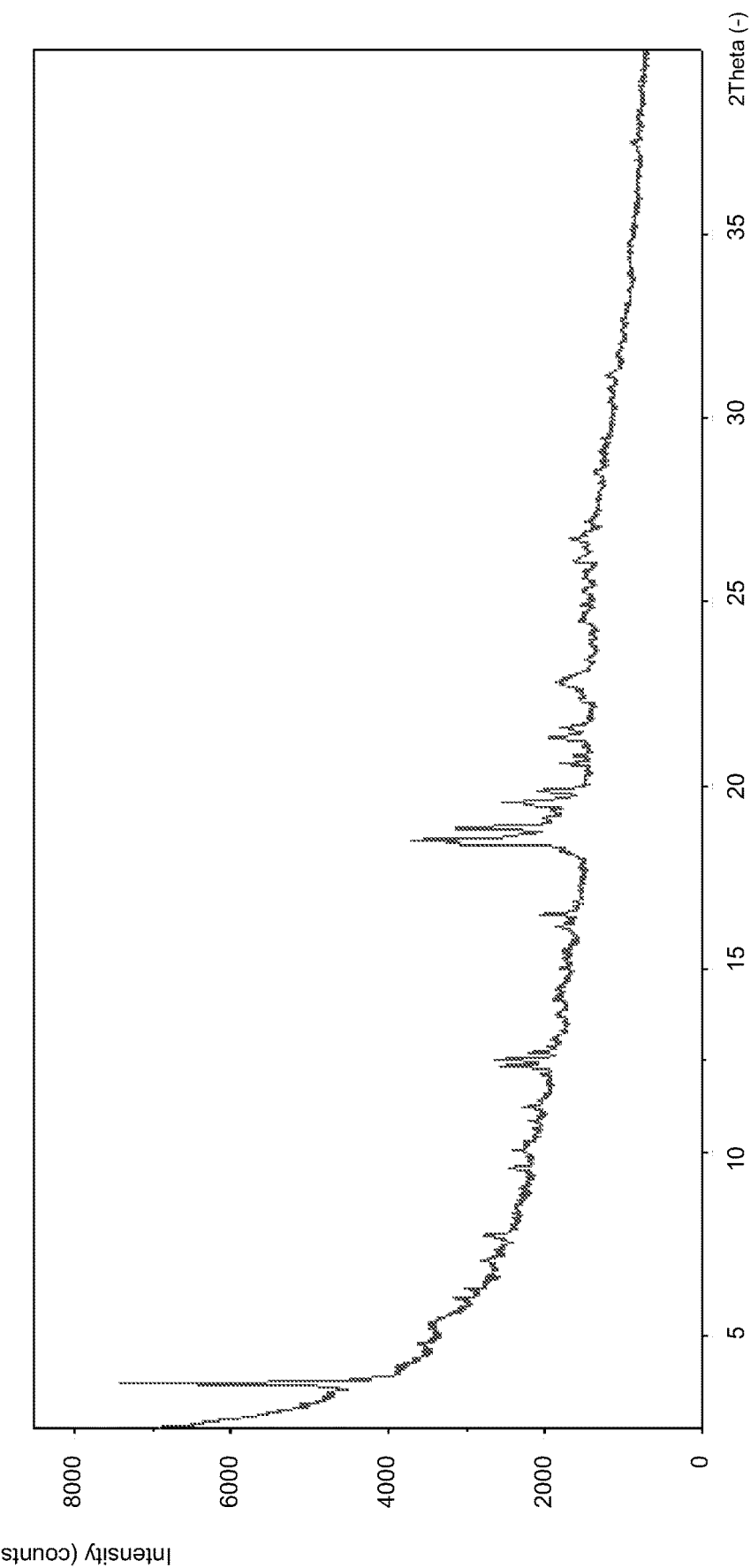
FIG. 9 is an X-ray diffraction diagram of Compound A when 20% MeOH aq was used.

After dissolving Compound A (39.1 mg) in 20% MeOH aq (0.195 ml) and allowing the solution to stand for 56 days at 4° C., the resulting solid was sampled in a holder for transmission measurement in which Kapton film had been set and subjected to an X-ray diffraction measurement using PANalytical Empyrean with copper X-ray tube at a tube voltage of 45 kV and a tube current of 40 mA to confirm the diffraction peaks. (FIG. 9)

The characteristic peaks in the diffraction are as follows.

In a powder X-ray analysis using Cu as a radiation source, $2\theta$ (°) exhibits peaks at around 3.7, around 6.1, around 6.3, around 7.0, around 7.7, around 9.6, around 12.4, around 12.5, around 12.7, around 18.5, and around 18.8.

Example 7

Figure 10:
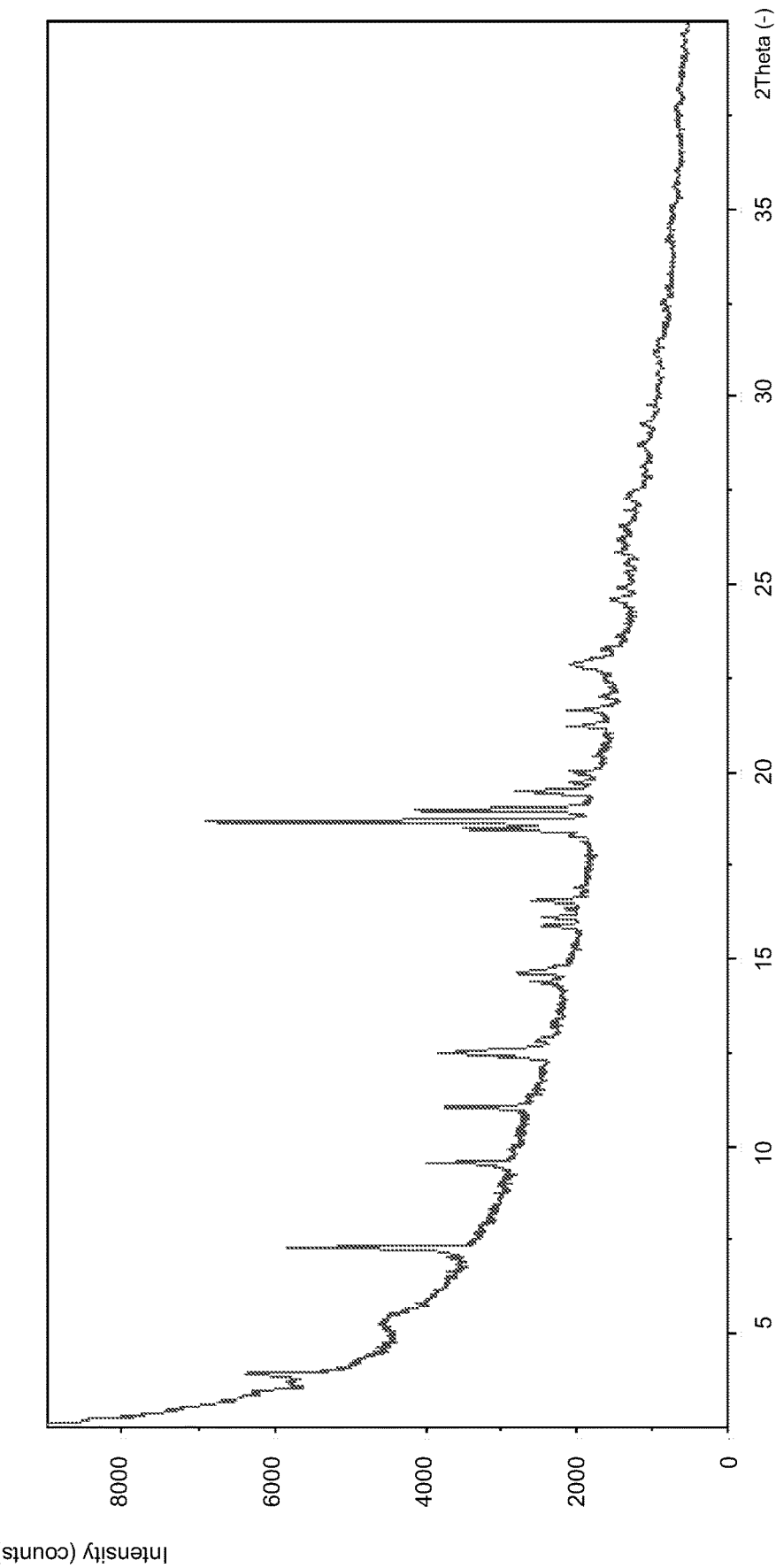
FIG. 10 is an X-ray diffraction diagram of Compound A when 20% EtOH aq was used.

After dissolving Compound A (36.3 mg) in 20% EtOH aq (0.181 ml) and allowing the solution to stand for 56 days at 4° C., the resulting solid was sampled in a holder for transmission measurement in which Kapton film had been set and subjected to an X-ray diffraction measurement using PANalytical Emipyrean with copper X-ray tube at a tube voltage of 45 kV and a tube current of 40 mA to confirm the diffraction peaks. (FIG. 10)

The characteristic peaks in the diffraction are as follows.

In a powder X-ray analysis using Cu as a radiation source, $2\theta$ (°) exhibits peaks at around 3.9, around 7.3, around 9.6, around 11.0, around 12.5, around 14.6, around 16.5, around 18.5, around 18.7, and around 19.0.

Example 8

Figure 11:
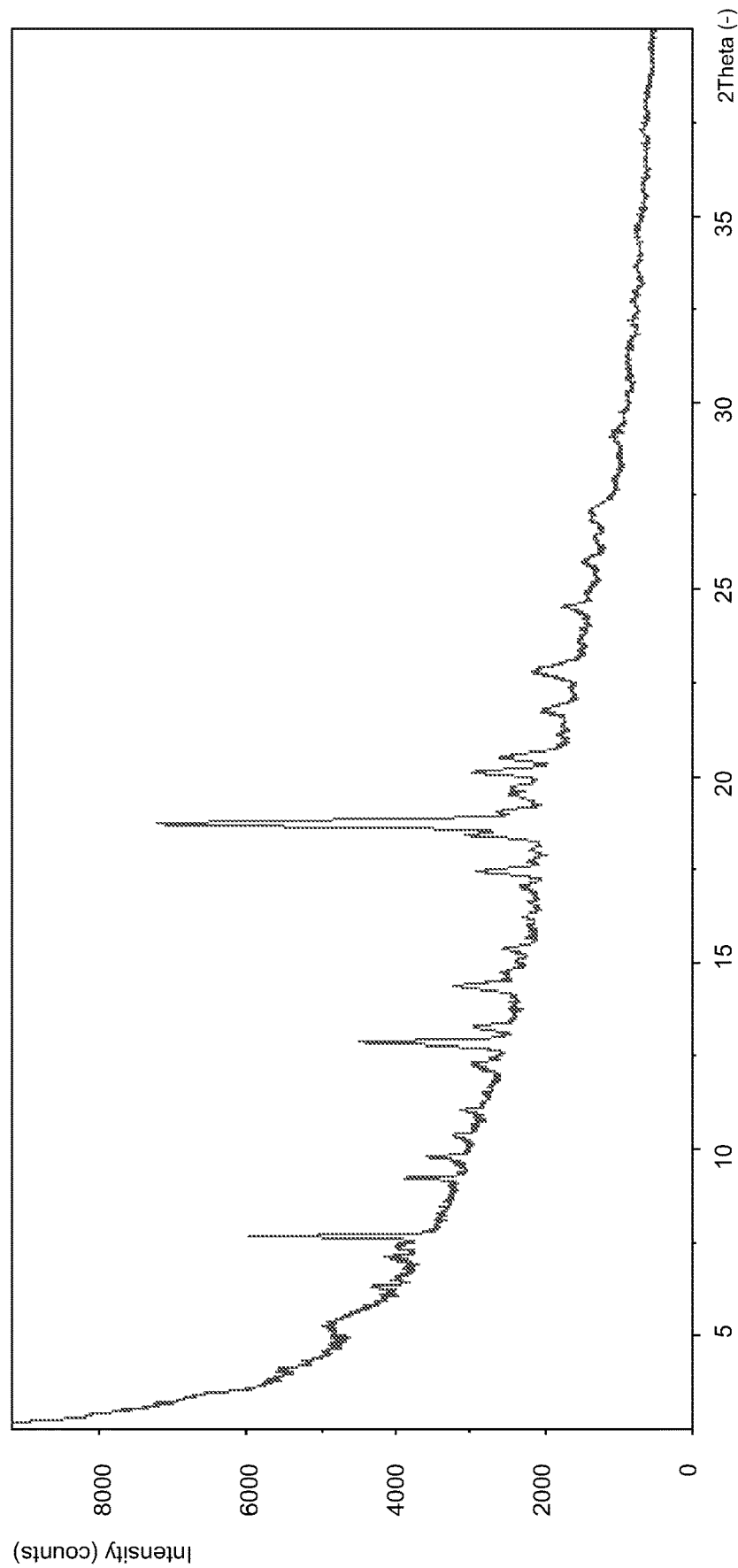
FIG. 11 is an X-ray diffraction diagram of Compound A when water was used.

After dissolving Compound A (28.5 mg) in water (0.087 ml) and allowing the solution to stand for 56 days at 4° C., the resulting solid was sampled in a holder for transmission measurement in which Kapton film had been set and subjected to an X-ray diffraction measurement using PANalytical Empyrean with copper X-ray tube at a tube voltage of 45 kV and a tube current of 40 mA to confirm the diffraction peaks. (FIG. 11)

The characteristic peaks in the diffraction are as follows.

In a powder X-ray analysis using Cu as a radiation source, $2\theta$ (°) exhibits peaks at around 7.7, around 9.2, around 9.8, around 10.4, around 11.1, around 12.3, around 12.9, around 13.3, around 14.4, and around 18.7.

Example 9

Crystallization Test

Three vials containing the compound A (see 9-1, 9-2 and 9-3) were stored at room temperature for 9 days, and then the vials were stored at 4° C. for 45-47 days.

The resulting solids were subjected to HPLC and X-ray diffraction measurement to confirm the purity and the physical state of compound A. X-ray diffraction measurement was conducted by using PANalytical Empyrean with copper X-ray tube at a tube voltage of 45 kV and a tube current of 40 mA.

9-1 High humidity storage: Compound A (52.0 mg) was stored under saturated water vapor at room temperature for 9 days, and then the vial was stored at 4° C. for 45 days.

9-2 Aqueous solution storage: Compound A (19.8 mg) was dissolved in 5 ml of purified water at room temperature for 9 days, and then the vial was stored at 4° C. for 45 days.

9-3 As powder: Compound A (28.0 mg) was stored at room temperature for 9 days, and then the vial was stored at 4° C. for 47 days.

The results were shown in Table 3.

Figure 12:
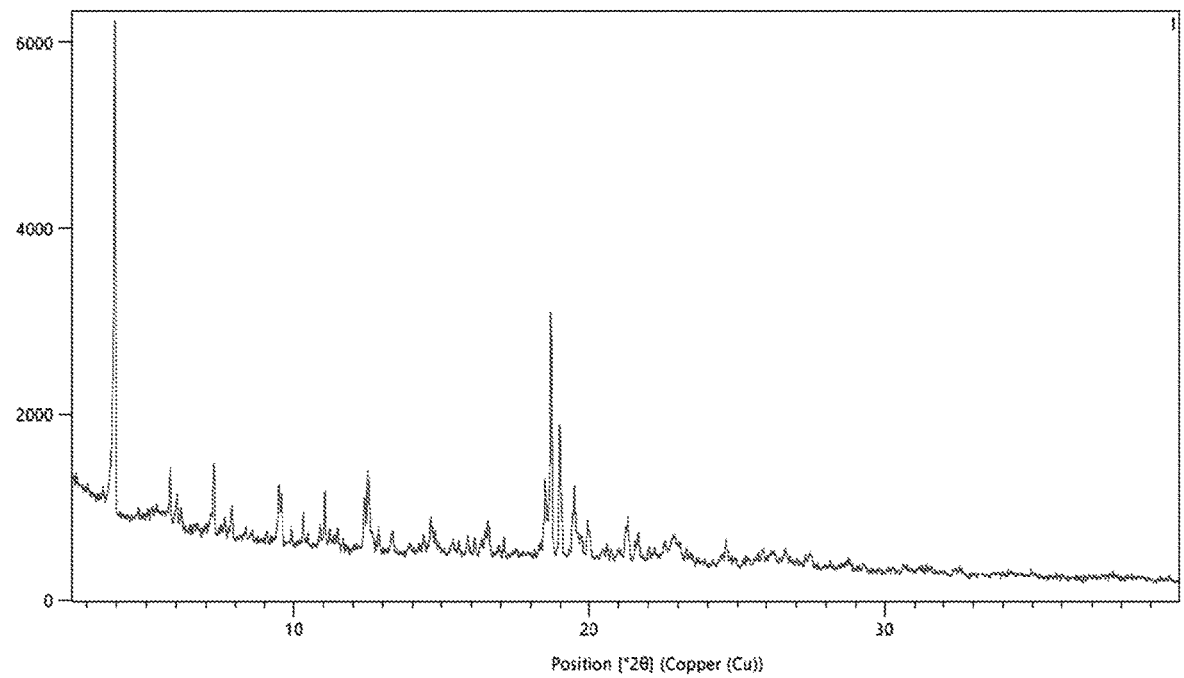
FIG. 12 is an X-ray diffraction diagram of Compound A with high humidity treatment.

In #9-1 the crystal of Compound A was obtained from Table 3 and FIG. 12.

The characteristic peaks of #9-1 in the diffraction are as follows.

In a powder X-ray analysis using Cu as a radiation source, 2θ (°) exhibits peaks at around 3.9, around 5.8, around 7.3, around 9.5, around 11.1, around 12.4, around 12.5, around 18.7, around 19.0, and around 19.5.

Figure 13:
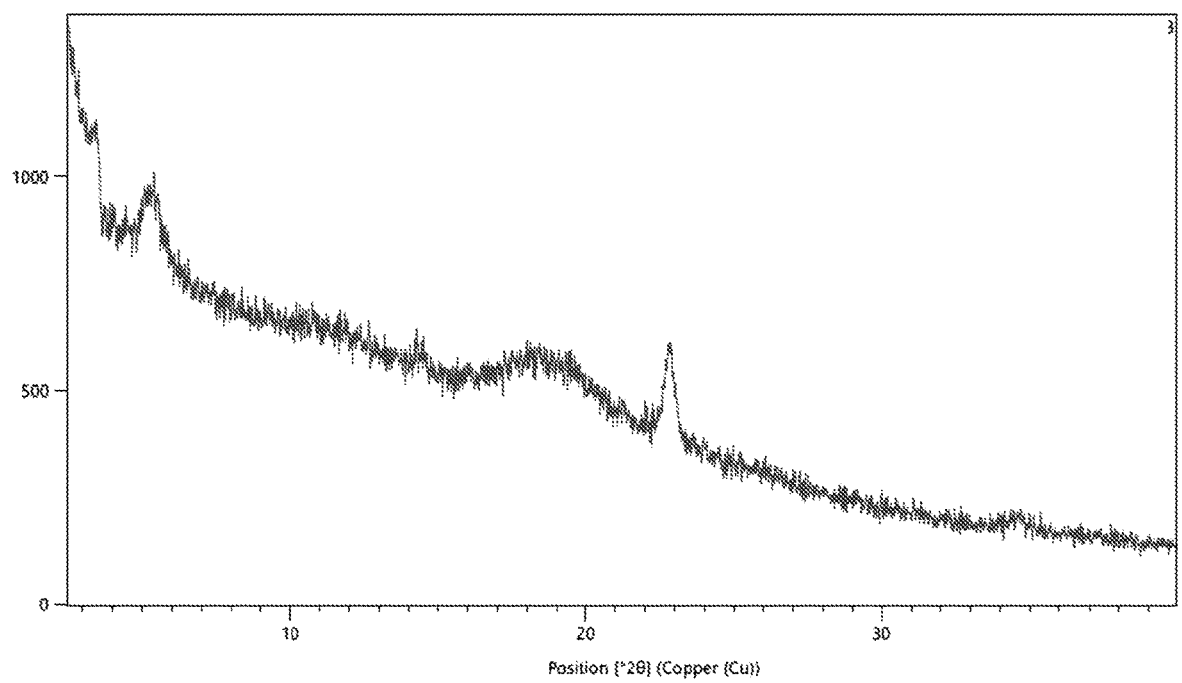
FIG. 13 is an X-ray diffraction diagram of Compound A when it was the amorphous form.

In #9-3 Compound A was still an amorphous from Table 3 and FIG. 13.

TABLE 3

|  | Purity (HPLC area %) | Physical condition |
|---|---|---|
| Initial | 97.5% | — |
| 9-1 | 93.2% | Crystal, FIG. 12 |
| 9-2 | 83.8% | Solution |
| 9-3 | 95.9% | Amorphous, FIG. 13 |

Example 10

Test to Identify a Range of Crystallization with Water

Five vials containing the compound A (see 10-1 to 10-5) were stored at 4° C. for 45 days. The resulting solids were subjected to HPLC and X-ray diffraction measurement to confirm the purity and the physical state of compound A. X-ray diffraction measurement was conducted by using PANalytical Empyrean with copper X-ray tube at a tube voltage of 45 kV and a tube current of 40 mA.

10-1 Compound A (50 mg) in purified water 100 µl
10-2 Compound A (50 mg) in purified water 10 µl
10-3 Compound A (50 mg) in purified water 20 µl
10-4 Compound A (50 mg) in purified water 30 µl
10-5 Compound A (50 mg) in purified water 40 µl The results were shown in Table 4.

Figure 14:
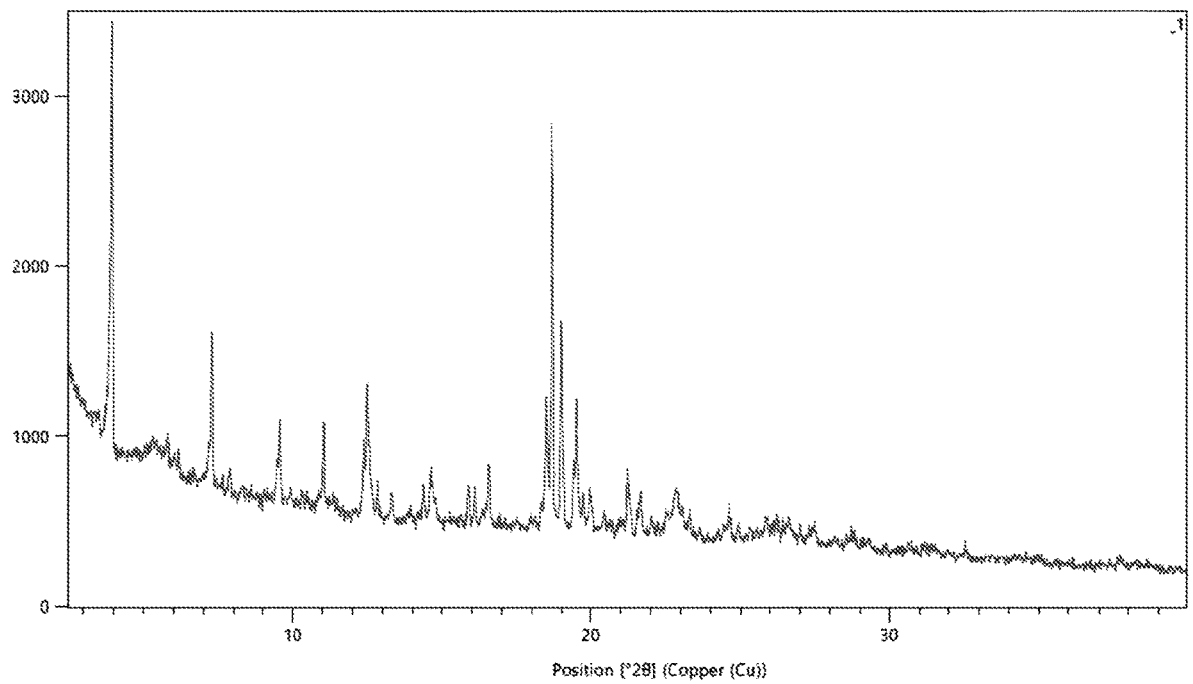
FIG. 14 is an X-ray diffraction diagram of Compound A in 100 μl of purified water.

In #10-1 the crystal of Compound A was obtained from Table 4 and FIG. 14.

The characteristic peaks in the diffraction are as follows:

In a powder X-ray analysis using Cu as a radiation source, 2θ (°) exhibits peaks at around 3.9, around 7.3, around 9.6, around 11.1, around 1.2.5, around 18.5, around 18.7, around 19.0, around 19.5, and around 21.2.

Figure 15:
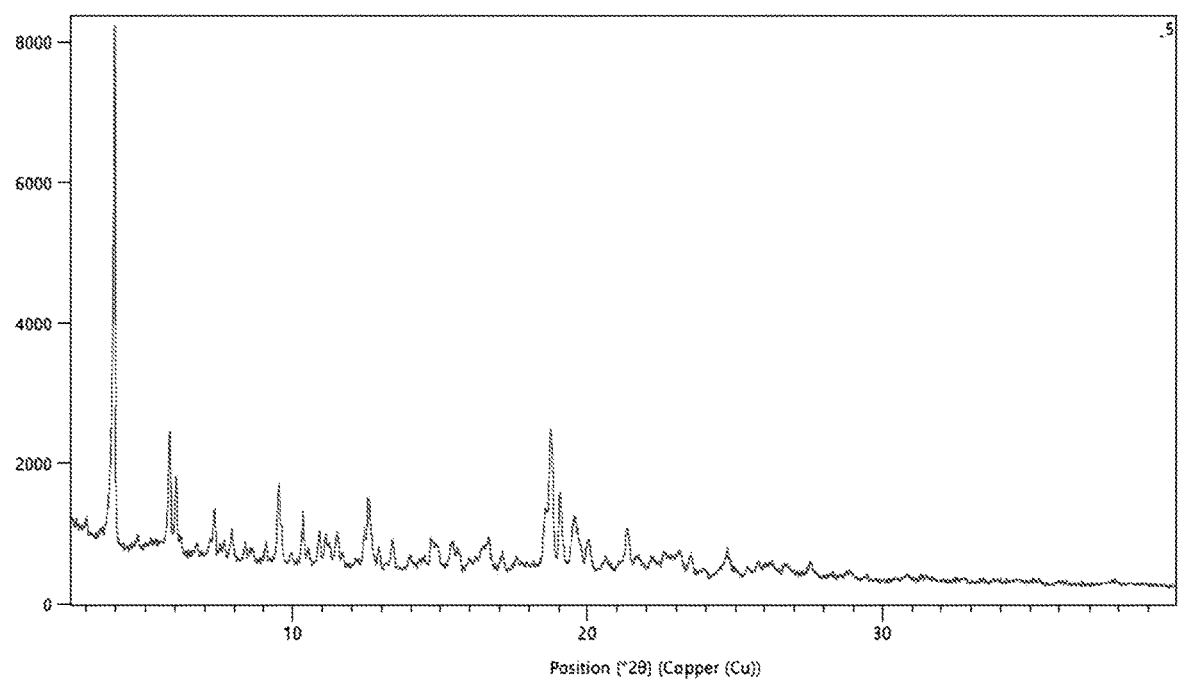
FIG. 15 is an X-ray diffraction diagram of Compound A in 40 μl of purified water.

In #10-5 the crystal of Compound A was obtained from Table 4 and FIG. 15.

The characteristic peaks in the diffraction are as follows:

In a powder X-ray analysis using Cu as a radiation source, 2θ (°) exhibits peaks at around 4.0, around 5.8, around 6.1, around 7.3, around 9.5, around 10.4, around 12.6, around 18.5, around 18.8, and around 19.0.

As a result, it was thought that Compound A (50 mg) in purified water of 40 µl to 100 µl formed a crystal.

TABLE 4

|  | Purity (HPLC area %) | Physical state |
|---|---|---|
| initial | 97.5% | — |
| 10-1 | 92.5% | Crystal, FIG. 14 |
| 10-2 | Not tested | Candy |
| 10-3 | Not tested | Candy |
| 10-4 | Not tested | Candy or oil |
| 10-5 | 91.3% | Crystal, FIG. 15 |

Example 11

Observation of Crystallinity Under Humidity Controlled Condition

X-ray diffraction measurement at controlled humidity conditions were measured by PANalytical Empyrean attached with Anton Paar MHC-trans chamber. Copper X-ray tube was used and tube voltage and tube current were 45 kV and 40 mA respectively. Compound A was sampled into a special holder for this measurement and stored in 100% RH (relative humidity) at room temperature for one day. The resulting solid was subjected to an X-ray diffraction measurement with relative humidity of sample chamber shifting from 90% RH to 40% RH subsequently 40% RH to 90% RH with 10% RH increments (holding each RH for 15 minutes before measurements), and temperature of chamber was maintained at 25° C.

The crystallinity was decreasing when the humidity was getting lower.

Figure 16:
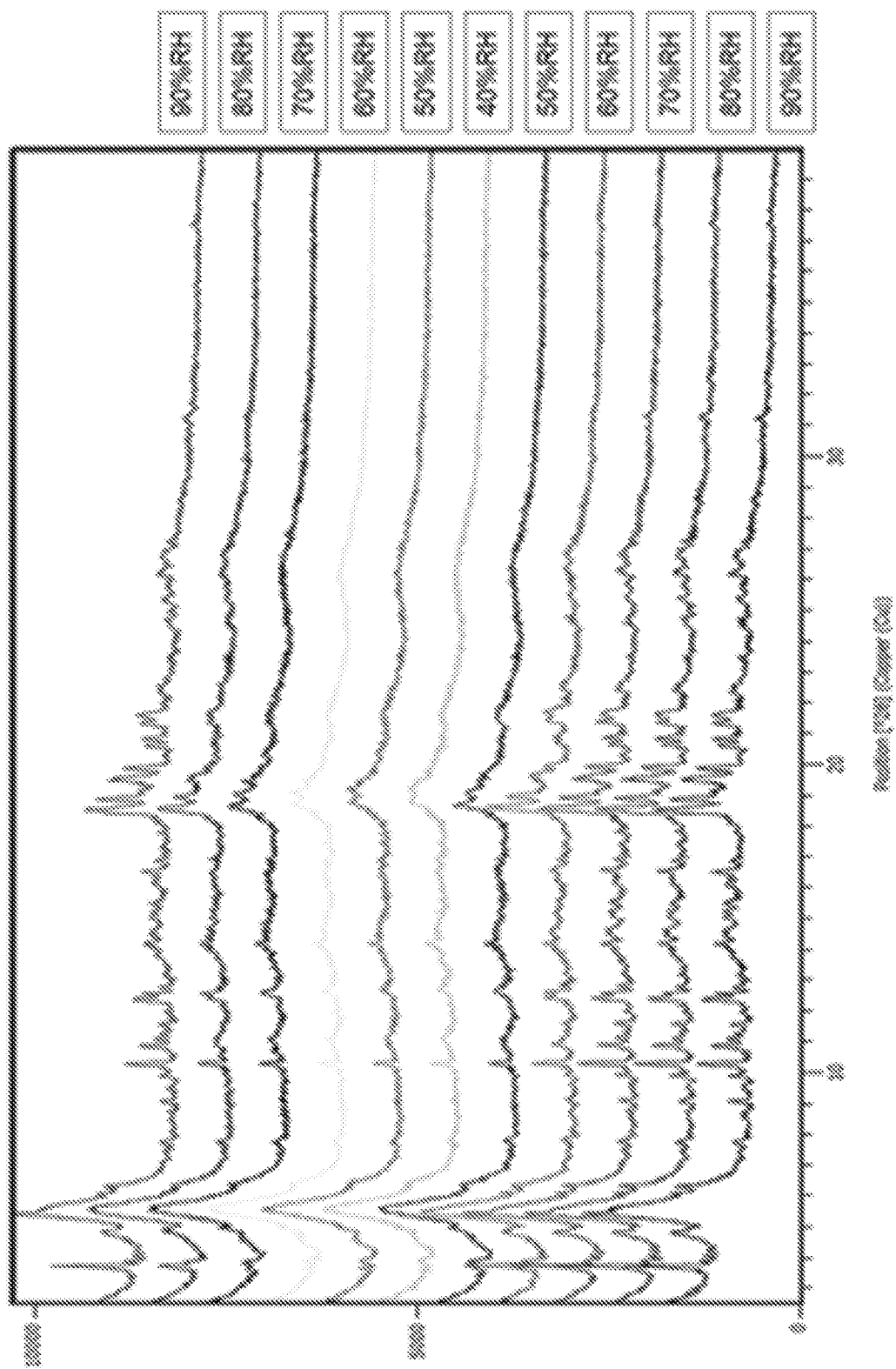
FIG. 16 is an X-ray diffraction diagram of Compound A under humidity.

And then when the humidity was getting higher again, the crystallinity recovered (FIG. 16).

The range of the humidity to maintain the crystal form was from relative humidity 40% to relative humidity 90% based on a result shown in FIG. 16.

Example 12

Test of Molecular Weight of the Crystal Under Humidity

Water sorption isotherm of Compound A from 5% RH to 95% RH at 25° C. was generated by dynamic vapor sorption measurement using TA Instruments Q5000SA.

Figure 17:
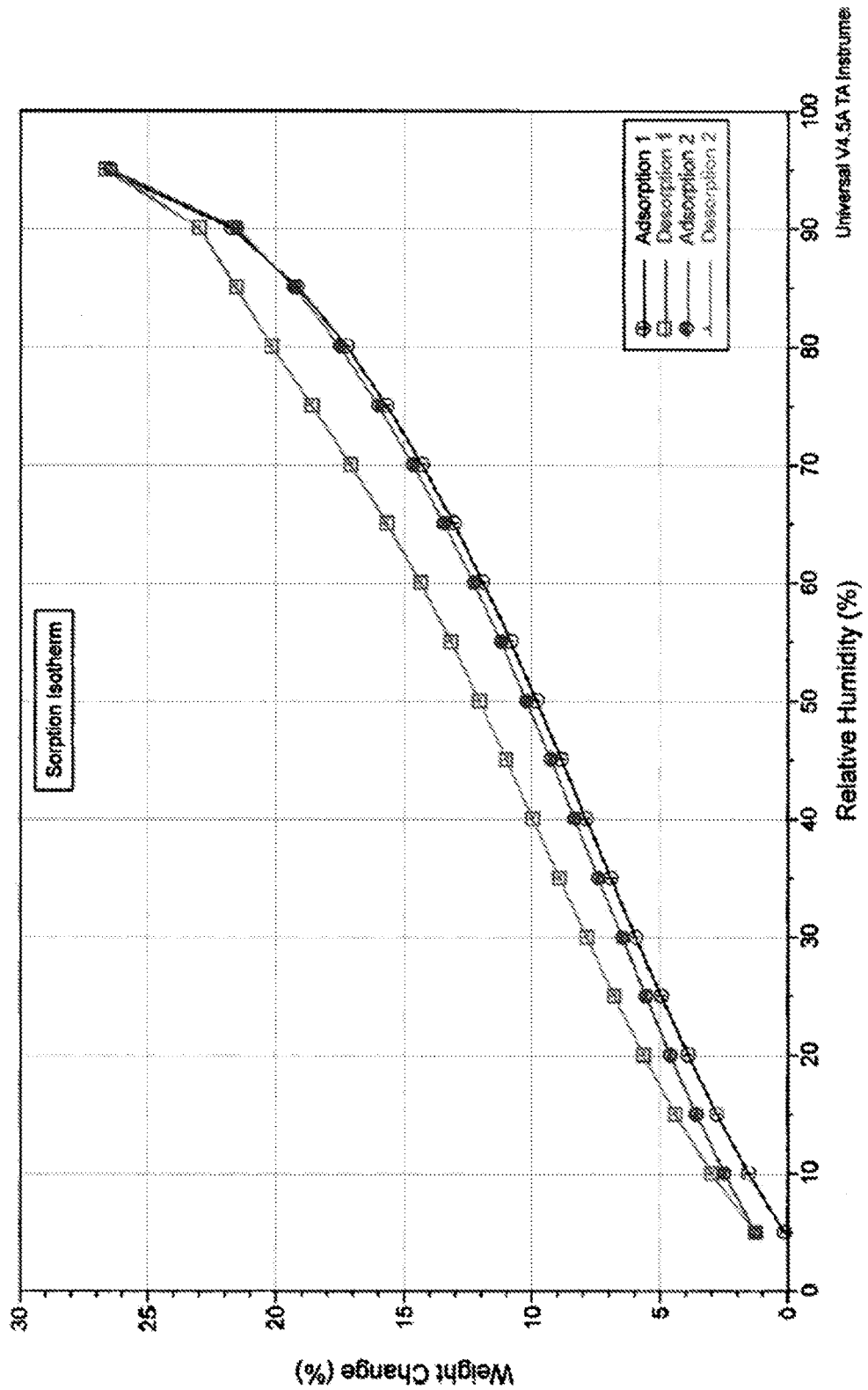
FIG. 17 is Weight change of Compound A under humidity.

Deliquescent was not observed, and the weight of Compound A was changed 26 wt % from 5% RH to 95% RH at 25° C. (FIG. 17).

An absorption amount of $H_2O$ was about 10 wt % and 44 wt % at 40% RH and 95% RH respectively, and these sorption amounts were equal to 17 mol and 44 mol of $H_2O$ molecules based on the molecular weight of Compound A, 3079.44.

From the results described above and Example 11, more than 17 mol of $H_2O$ molecules were needed to form the crystal.

The invention claimed is:

1. A crystal of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride.

2. The crystal according to claim 1, wherein in the powder X-ray analysis using Cu as a radiation source, 2θ (°) exhibits peaks at around 3.7, around 6.1, around 6.3, around 7.0, around 7.7, around 9.6, around 12.4, around 12.5, around 12.7, around 18.5, and around 18.8.

3. The crystal according to claim 1, wherein in the powder X-ray analysis using Cu as a radiation source, 2θ (°) exhibits peaks at around 3.9, around 7.3, around 9.6, around 11.0, around 12.5, around 14.6, around 16.5, around 18.5, around 18.7, and around 19.0.

4. The crystal according to claim 1, wherein in the powder X-ray analysis using Cu as a radiation source, 2θ (°) exhibits peaks at around 7.7, around 9.2, around 9.8, around 10.4, around 11.1, around 12.3, around 12.9, around 13.3, around 14.4, and around 18.7.

5. The crystal according to claim 1, wherein in the powder X-ray analysis using Cu as a radiation source, 2θ (°) exhibits peaks at around 3.7, around 4.3, around 4.8, around 5.4, around 6.3, around 7.7, around 10.9, around 12.3, around 18.4, and around 19.4.

6. The crystal according to claim 1, wherein in the powder X-ray analysis using Cu as a radiation source, 2θ (°) exhibits peaks at around 3.7, around 4.3, around 4.8, around 5.4, around 9.5, around 10.9, around 16.2, around 18.4, around 18.6, and around 19.4.

7. The crystal according to claim 1, wherein in the powder X-ray analysis using Cu as a radiation source, 2θ (°) exhibits peaks at around 3.0, around 3.7, around 4.1, around 4.5, around 5.7, around 6.1, around 7.2, around 7.8, around 17.2, and around 17.6.

8. The crystal according to claim 1, wherein in the powder X-ray analysis using Cu as a radiation source, 2θ (°) exhibits peaks at around 3.7, around 4.8, around 5.4, around 6.1, around 6.3, around 9.0, around 9.9, around 10.3, around 12.4, around 18.5, and around 19.5.

9. A method for preparing a crystal of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride comprising:
Adding 40 µl to 100 µl of water solution of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride.

10. The method according to claim 9, wherein said volume of water is 40 µl to 100 µl of water to per 50 mg of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride.

11. The method according to claim 9, wherein the temperature of said method is over 0° C. to 5° C.

12. The method according to claim 9, wherein the temperature of said method is 4° C.

13. A method for preparing a crystal of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride, said method comprising:
subjecting 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride to relative humidity of 40% to relative humidity 95% to form the crystal.

14. The method according to claim 13, wherein the relative humidity is relative humidity 40% to relative humidity 90%.

15. A crystal of 3-(3-{[3-(cyclomaltoheptaos-21-O-yl)propyl]amino}-3-oxopropyl)-2-{(1E)-2-[(3E)-3-{(2E)-2-[3-(3-{[3-(cyclomaltoheptaos-21-O-yl)propyl]amino}-3-oxopropyl)-1,1-dimethyl-1,3-dihydro-2H-benzo[e]indol-2-ylidene]ethylidene}-2-methoxycyclohex-1-en-1-yl]ethen-1-yl}-1,1-dimethyl-1H-benzo[e]indol-3-ium chloride having 10 to 45 mol of water molecule.

16. The crystal according to claim 15 having 17 to 45 mol of water molecule.

17. The crystal according to claim 15 having 17 to 38 mol of water molecule.

18. The method according to claim 10, wherein the temperature of said method is over 0° C. to 5° C.

19. The method according to claim 10, wherein the temperature of said method is 4° C.

20. The crystal according to claim 16 having 17 to 38 mol of water molecule.

* * * * *